US011275932B2

(12) United States Patent
Yang et al.

(10) Patent No.: US 11,275,932 B2
(45) Date of Patent: Mar. 15, 2022

(54) HUMAN BODY ATTRIBUTE RECOGNITION METHOD, APPARATUS, AND DEVICE AND MEDIUM

(71) Applicant: Tencent Technology (Shenzhen) Company Limited, Shenzhen (CN)

(72) Inventors: Siqian Yang, Shenzhen (CN); Jilin Li, Shenzhen (CN); Yongjian Wu, Shenzhen (CN); Yichao Yan, Shenzhen (CN); Keke He, Shenzhen (CN); Yanhao Ge, Shenzhen (CN); Feiyue Huang, Shenzhen (CN); Chengjie Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 3 days.

(21) Appl. No.: 16/938,858

(22) Filed: Jul. 24, 2020

(65) Prior Publication Data

US 2020/0356767 A1    Nov. 12, 2020

Related U.S. Application Data

(63) Continuation of application No. PCT/CN2019/082977, filed on Apr. 17, 2019.

(30) Foreign Application Priority Data

May 30, 2018 (CN) .......................... 201810541546.6

(51) Int. Cl.
*G06K 9/00*       (2006.01)
*G06K 9/62*       (2022.01)
*G06N 3/08*       (2006.01)

(52) U.S. Cl.
CPC ...... *G06K 9/00369* (2013.01); *G06K 9/00771* (2013.01); *G06K 9/6256* (2013.01); *G06K 9/6262* (2013.01); *G06N 3/08* (2013.01)

(58) Field of Classification Search
None
See application file for complete search history.

(56) References Cited

U.S. PATENT DOCUMENTS

2013/0322740 A1    12/2013    Chen et al.
2019/0102609 A1*    4/2019    Zhao .................... G06K 9/6268
2020/0012880 A1*    1/2020    Yao ..................... G06K 9/4604

FOREIGN PATENT DOCUMENTS

CN    104992142 A    10/2015
CN    105957086 A     9/2016
(Continued)

OTHER PUBLICATIONS

Zhong Ji et al. "Deep Pedestrian Attribute Recognition Based On LSTM", 2017 IEEE International Conference on Image Processing, Feb. 22, 2018, 3 pgs.
(Continued)

*Primary Examiner* — Leon Flores
(74) *Attorney, Agent, or Firm* — Morgan, Lewis & Bockius LLP

(57) ABSTRACT

This application discloses a human attribute recognition method performed at a computing device. The method includes: determining a human body region image in a surveillance image; inputting the human body region image into a multi-attribute convolutional neural network model, to obtain, for each of a plurality of human attributes in the human body region image, a probability that the human attribute corresponds to a respective predefined attribute value, the multi-attribute convolutional neural network model being obtained by performing multi-attribute recognition and training on a set of pre-obtained training images
(Continued)

Recognize a plurality of human attributes simultaneously by using a multi-attribute convolutional neural network model according to an embodiment of this application Recognize the plurality of human attributes separately by using an attribute recognition model according to some embodiments by using a multi-attribute convolutional neural network; determining, for each of the plurality of human attributes in the human body region image, the attribute value of the human attribute based on the corresponding probability; and displaying the attribute values of the plurality of human attributes next to the human body region image.

20 Claims, 5 Drawing Sheets

(56) References Cited

FOREIGN PATENT DOCUMENTS

| | | | |
|---|---|---|---|
| CN | 106250874 | A | 12/2016 |
| CN | 107247947 | A | 10/2017 |
| CN | 107316001 | A | 11/2017 |
| CN | 107330396 | A | 11/2017 |
| CN | 107516316 | A | 12/2017 |
| CN | 107678059 | A | 2/2018 |
| CN | 108052894 | A | 5/2018 |
| CN | 108053061 | A | 5/2018 |
| CN | 108073876 | A | 5/2018 |
| CN | 108921022 | A | 11/2018 |
| KR | 20170006356 | A | 1/2017 |

OTHER PUBLICATIONS

Tencent Technology, ISR, PCT/CN2019/082977, Jul. 18, 2019, 2 pgs.
Tencent Technology, WO, PCT/CN2019/082977, Jul. 18, 2019, 5 pgs.
Tencent Technology, IPRP, PCT/CN2019/082977, Dec. 1, 2020, 6 pgs.

* cited by examiner

Recognize a plurality of human attributes simultaneously by using a multi-attribute convolutional neural network model according to an embodiment of this application Recognize the plurality of human attributes separately by using an attribute recognition model according to some embodiments

US 11,275,932 B2

HUMAN BODY ATTRIBUTE RECOGNITION METHOD, APPARATUS, AND DEVICE AND MEDIUM

CROSS-REFERENCE TO RELATED APPLICATIONS

This application is a continuation application of PCT Patent Application No. PCT/CN2019/082977, entitled "HUMAN BODY ATTRIBUTE RECOGNITION METHOD, APPARATUS, AND DEVICE, AND MEDIUM", filed on Apr. 17, 2019, which claims priority to Chinese Patent Application No. 201810541546.6, filed with the Chinese Patent Office on May 30, 2018 and entitled "HUMAN BODY ATTRIBUTE RECOGNITION METHOD, APPARATUS, AND DEVICE AND MEDIUM", all of which are incorporated herein by reference in their entirety.

FIELD OF THE TECHNOLOGY

This application relates to the field of image recognition technologies, and in particular, to a human attribute recognition method, apparatus, and device and a computer-readable storage medium.

BACKGROUND OF THE APPLICATION

Human attribute recognition is the recognition of the gender and age of a person and the type and color of clothes that the person wears, and can be widely applied to fields such as the locking of a target person in dangerous behavior warning, traffic violation monitoring, and industrial security and at public places such as a vending machine, an automatic teller machine (ATM), a shopping mall, and a station.

Although there have been great achievements in current human attribute recognition technologies, a plurality of human attributes cannot be simultaneously recognized.

SUMMARY

Embodiments of this application provide a human attribute recognition method, apparatus, and device and a medium.

Specific technical solutions provided by the embodiments of this application are as follows:

An embodiment of this application provides a human attribute recognition method, performed by a computing device, including: determining a human body region image in an image; inputting the human body region image into a multi-attribute convolutional neural network model, to obtain, for each of a plurality of human attributes in the human body region image, a probability that the human attribute corresponds to a respective predefined attribute value, the multi-attribute convolutional neural network model being obtained by performing multi-attribute recognition and training on a set of pre-obtained training images by using a multi-attribute convolutional neural network; determining, for each of the plurality of human attributes in the human body region image, the attribute value of the human attribute based on the corresponding probability; and displaying the attribute values of the plurality of human attributes next to the human body region image.

An embodiment of this application further provides a computing device, comprising a memory and a processor, the memory storing a plurality of computer-readable instructions, the instructions causing the processor to perform the aforementioned human attribute recognition method.

The embodiments of this application further provide a non-transitory computer-readable storage medium, storing a plurality of processor-executable instructions, the instructions, when executed by one or more processors of a computing device, causing the one or more processors to perform the human attribute recognition method.

DESCRIPTION OF EMBODIMENTS

Figure 1A:
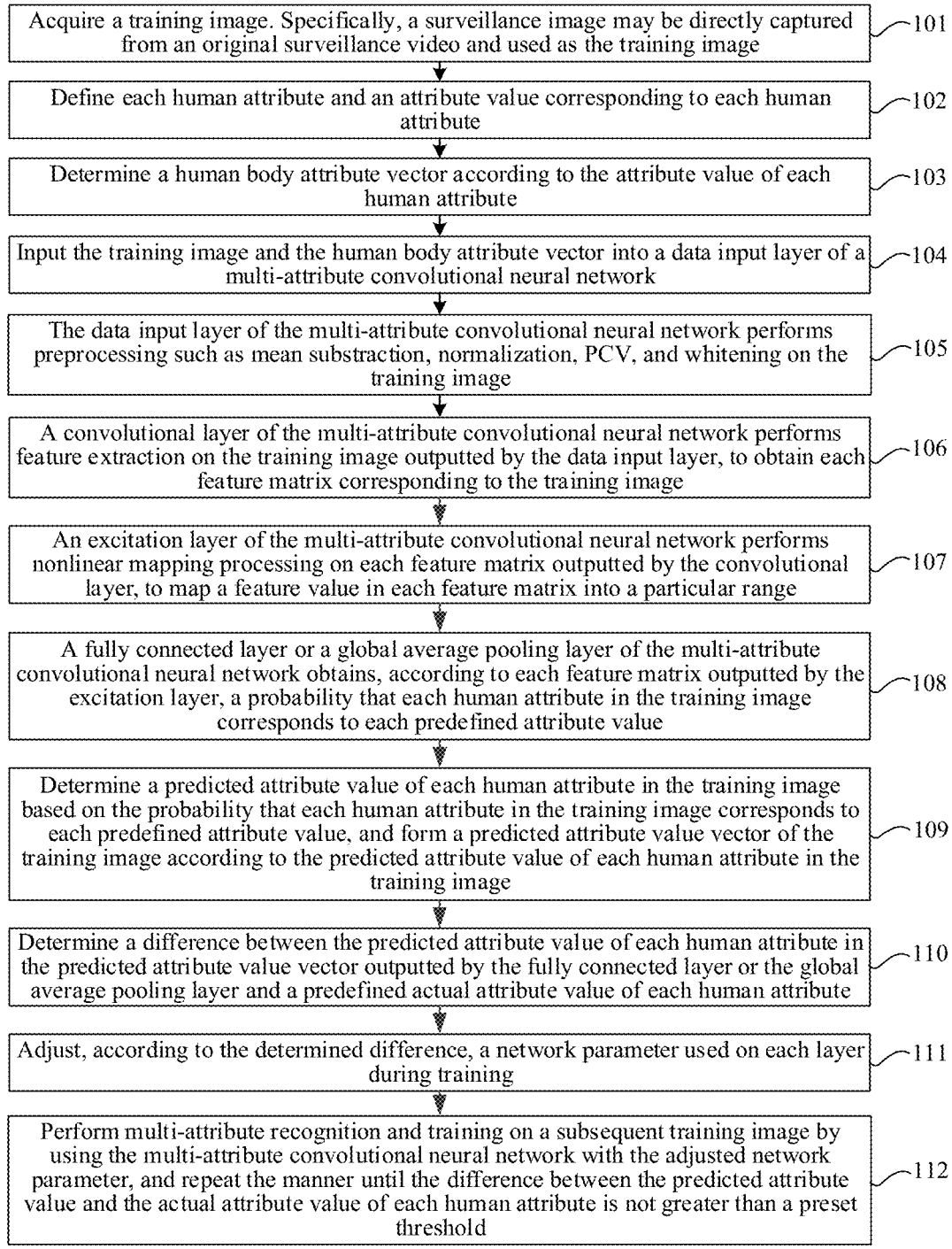
FIG. 1A is a schematic flowchart of a method for training a multi-attribute convolutional neural network model according to an embodiment of this application.

During actual application, a target person can be locked according to a plurality of human attributes. Therefore, the precise recognition of attribute values of a plurality of human attributes is essential to the locking of a target person. During the development process of this invention, the inventor of this application considered the approach of using a multi-attribute multi-model method to recognize each human attribute. Specifically, in the approach, an attribute recognition model is separately built for each human attribute. That is, one human attribute corresponds to one attribute recognition model. In this case, during video surveillance, a surveillance image may be acquired in real time, and a human body region image in the surveillance image is detected, so that each human attribute in the human body region image is separately recognized by using each built attribute recognition model, thereby achieving the objective of multi-attribute recognition. However, in a specific implementation, the inventor of this application finds that although the multi-attribute multi-model method can somewhat implement the multi-attribute recognition, preprocessing operations are complex because one attribute recognition model needs to be separately built for each human attribute. In addition, during the multi-attribute recognition, each pre-built attribute recognition model is required to separately recognize a corresponding human attribute. As a result, a plurality of human attributes cannot be simultaneously recognized, leading to relatively low recognition efficiency.

In view of this, the inventor of this application conceives of using a multi-attribute convolutional neural network to perform multi-attribute recognition and training on a pre-obtained training image, so as to build one multi-attribute convolutional neural network model. In this way, during video surveillance, a surveillance image may be acquired in real time, and in a case that a human body region image in the surveillance image is detected, human attributes in the human body region image are simultaneously recognized by using the multi-attribute convolutional neural network model, thereby implementing the function of simultaneously recognizing a plurality of human attributes and effectively improving the efficiency of recognizing a plurality of human attributes.

The human attribute recognition method according to embodiments of this application may be applied to a plurality of video surveillance scenarios such as dangerous behavior surveillance, traffic violation monitoring, industrial security monitoring, and surveillance in public places such as a vending machine, an ATM, a shopping mall, and a station. The foregoing application scenarios are shown only for better understanding of the spirit and principle of this application, and this aspect is not limited at all in the embodiments of this application. On the contrary, the embodiments of this application may be applied to any suitable scenario. For example, the embodiments of this application may be applied to offline retail scenarios in a shopping mall or a brick-and-mortar store. Attribute information about customers entering the store or passing the store is recognized and customer profiles are collected to facilitate applications such as precision marketing, personalized recommendation, location selection for brick-and-mortar stores, and trend analysis. In another example, the embodiments of this application may also be applied in the intelligent upgrade of building advertisements and outdoor advertisements. Human information is collected, crowd attributes are analyzed, and advertisement materials are placed in a targeted manner, thereby improving user experience and commercial efficiency.

After the human attribute recognition method and the application scenarios of the human attribute recognition according to the embodiments of this application are briefly described, the following clearly and completely describes the human attribute recognition method in the embodiments of this application with reference to the accompanying drawings in the embodiments of this application. Apparently, the described embodiments are only some embodiments of this application rather than all of the embodiments. All other embodiments obtained by a person of ordinary skill in the art based on the embodiments of this application without creative efforts shall fall within the protection scope of this application.

For better understanding of this application, some technical terms used in the embodiments of this application are described first.

1. A human attribute is a visual human feature that can be perceived by both a computer and a person, and is, for example, gender, age, upper garment texture, upper garment color, sleeve type, lower garment texture, lower garment color, lower garment length, and lower garment type.

2. An attribute value of a human attribute is a value assigned to the human attribute. For example, an attribute value of human attribute-gender is male or female. An attribute value of human attribute-age is orphan, child, youth, middle age, senior or the like. An attribute value of human attribute-upper garment texture is solid color, horizontal stripe, vertical stripe, plaid, large color block or the like. An attribute value of human attribute-upper garment color is red, yellow, blue, black, mixed color or the like.

3. An attribute recognition model is a model that can simultaneously recognize attribute values of a plurality of human attributes. The embodiments of this application are described by using a multi-attribute convolutional neural network model as the attribute recognition model.

4. A multi-attribute convolutional neural network model is an attribute recognition model that is obtained by performing multi-attribute recognition and training on a pre-obtained training image by using a multi-attribute convolutional neural network and can simultaneously recognize a plurality of human attributes.

5. A multi-attribute convolutional neural network is a deep learning-based feedforward neural network including a data input layer, a convolutional layer, an activation layer, and a fully connected layer or including a data input layer, a convolutional layer, an activation layer, and a global average pooling layer.

The multi-attribute convolutional neural network model is used in the human attribute recognition method according to the embodiments of this application. The multi-attribute convolutional neural network model is obtained by performing the multi-attribute recognition and training on the pre-obtained training image by using the multi-attribute convolutional neural network. Therefore, next, a method for training a multi-attribute convolutional neural network model is described below according to exemplary implementations of this application. Referring to FIG. 1A, the procedure of the method for training a multi-attribute convolutional neural network model is as follows:

Step 101: Acquire a training image. Specifically, a surveillance image may be directly captured from a stored surveillance video and used as the training image.

Step 102: Define each human attribute and an attribute value corresponding to each human attribute.

For example, human attributes are defined as gender, age, face orientation, upper garment texture, upper garment color, sleeve type, bag type, lower garment color, lower garment length, and lower garment type.

An attribute value of human attribute-gender is defined as male or female. An attribute value of human attribute-age is defined as child, youth, middle age or senior. An attribute value of human attribute-face orientation is defined as front or back. An attribute value of human attribute-upper garment texture is defined as solid color, plaid or large color block. An attribute value of human attribute-upper garment color is defined as red, yellow, green, blue, black or greyish white. An attribute value of human attribute-sleeve type is defined as long-sleeved or short-sleeved. An attribute value of human attribute-bag type is defined as backpack, messenger bag, handbag or no bag. An attribute value of lower garment color is defined as black, greyish white or colored. An attribute value of human attribute-lower garment length is defined as long or short. An attribute value of human attribute-lower garment type is defined as trousers or skirt. Details are shown in Table 1.

TABLE 1

| Human attribute | Gender | Age group | Face orientation | Upper garment texture | Upper garment color | Sleeve type | Bag type | Lower garment color | Lower garment length | Lower garment type | ... |
|---|---|---|---|---|---|---|---|---|---|---|---|
| Attribute value | Male | Child | Front | Solid color | Red | Long-sleeved | Backpack | Black | Long | Trousers | |
| | Female | Youth | Back | Plaid | Yellow | Short-sleeved | Messenger bag | Greyish White | Short | Skirt | |
| | | Middle age | ... | Large color block | Green | ... | Handbag | Colored | ... | ... | |
| | | Senior | | ... | Blue | | No Bag | ... | | | |
| | | ... | | | Black | | ... | | | | |
| | | | | | Greyish white | | | | | | |
| | | | | | ... | | | | | | |

Step 103: Determine a human body attribute vector according to the attribute value of each human attribute.

For example, a 1×30 1×30 human body attribute vector may be determined according to the attribute value of each human attribute in Table 1. That is, the human body attribute vector=(gender: male, gender: female, child, youth, middle age, senior, face orientation: front, face orientation: back, upper garment texture: solid color, upper garment texture: plaid, upper garment texture: large color block, upper garment color: red, upper garment color: yellow, upper garment color: green, upper garment color: blue, upper garment color: black, upper garment color: greyish white, long-sleeved, short-sleeved, backpack, messenger bag, handbag, no bag, lower garment color: black, lower garment color: greyish white, lower garment color: colored, lower garment length: long, lower garment length: short, lower garment type: trousers, and lower garment type: skirt).

In some embodiments, the foregoing attribute values of each attribute may further be dichotomized and values are assigned. For example, values are assigned according to whether the gender is male, where 1 is assigned in a case that the gender is male, 0 is assigned in a case that the gender is not male, and 99 is assigned in a case that the gender is unrecognizable. Similarly, values are assigned according to whether the color is green, where 1 is assigned in a case that the color is green, 0 is assigned in a case that the color is not green, and 99 is assigned in a case that the color is unrecognizable. In this way, the assigned values of other attributes can be obtained, so that the 1×30 human body attribute vector is obtained. For example, the training image or a test image is processed in the foregoing manner to obtain the following vectors:

Image_1 1 0 1 . . . 0 1
Image_2 0 1 99 . . . 1 0
. . .
Image_i 1 0 99 . . . 0 1
. . .
Image_n 1 0 0 . . . 0 1 where Image_i represents a relative path of image i, 0 and 1 represent corresponding dichotomous attribute values, and 99 represents unrecognizable.

Step 104: Input the training image and the human body attribute vector into a data input layer of a multi-attribute convolutional neural network.

Step 105: The data input layer of the multi-attribute convolutional neural network performs preprocessing such as mean subtraction, normalization, principal component analysis (PCV), and whitening on the training image.

Step 106: A convolutional layer of the multi-attribute convolutional neural network performs feature extraction on the training image outputted by the data input layer, to obtain each feature matrix corresponding to the training image.

Step 107: An activation layer of the multi-attribute convolutional neural network performs nonlinear mapping processing on each feature matrix outputted by the convolutional layer, to map a feature value in each feature matrix into a particular range. Specifically, during nonlinear mapping, an activation function herein may be, but is not limited to, a Sigmoid function, a Tan h function (hyperbolic tangent function) or a rectified linear unit (ReLU) function. In some embodiments, the ReLU function may be used as the activation function, to perform the nonlinear mapping processing on each feature matrix outputted by the convolutional layer.

Step 108: A fully connected layer or a global average pooling layer of the multi-attribute convolutional neural network obtains, according to each feature matrix outputted by the activation layer, a probability that each human attribute in the training image corresponds to each predefined attribute value.

Only that the fully connected layer of the multi-attribute convolutional neural network determines the probability that each human attribute in the training image corresponds to each predefined attribute value is used is used as an example for description. Specifically, a manner used can be, but is not limited to, the following manner: setting an offset, setting a weight matrix for each human attribute, and determining, according to each feature matrix outputted by the activation layer, the preset offset, and each weight matrix, the probability that each human attribute in the training image corresponds to each predefined attribute value.

Step 109: Determine a predicted attribute value of each human attribute in the training image based on the probability that each human attribute in the training image corresponds to each predefined attribute value, and form a predicted attribute value vector of the training image according to the predicted attribute value of each human attribute in the training image.

Specifically, a manner used to determine the predicted attribute value of each human attribute in the training image based on the probability that each human attribute in the training image corresponds to each predefined attribute value can be, but is not limited to, the following manner: selecting, for each human attribute in the training image, a corresponding attribute value with the highest probability among the probabilities that the human attributes correspond to the predefined attribute values as the predicted attribute value of the human attribute.

Step 110: Determine a difference between the predicted attribute value of each human attribute in the predicted attribute value vector outputted by the fully connected layer or the global average pooling layer and a predefined actual attribute value of each human attribute.

In some embodiments, a function is used to determine the difference between the predicted attribute value of each human attribute and the actual attribute value, and the function is, but is not limited to, a cross-entropy loss function shown in the following Formula (1):

$$L = -\frac{1}{n}\sum_{x}^{n}\frac{1}{M}\sum_{i}^{m}[y_i \ln a_i + (1-y_i)\ln(1-a_i)] \quad \text{Formula (1)}$$

where in the foregoing Formula (1), L represents the value, that is, the difference, of the cross-entropy loss function, n represents a quantity of training images, x represents an $x^{th}$ training image, m represents a quantity of predefined human attributes, and $y_i$ and $a_i$ respectively represent an actual attribute value and a predicted attribute value of an $i^{th}$ human attribute.

Step 111: Adjust, according to the determined difference, a network parameter used on each layer during training. The network parameter on each layer includes, but is not limited to, a kernel parameter and an initial offset matrix on each convolutional layer, a parameter on each activation layer, and a parameter on each fully connected layer or global average pooling layer.

Step 112: Perform multi-attribute recognition and training on a subsequent training image by using the multi-attribute convolutional neural network with the adjusted network parameter, and repeat the manner until the difference between the predicted attribute value and the actual attribute value of each human attribute is not greater than a preset threshold.

In this case, each network parameter, corresponding to the multi-attribute convolutional neural network, on each layer is an optimal value. At this moment, the training of the multi-attribute convolutional neural network model is terminated, and the multi-attribute convolutional neural network model with each network parameter on each layer being the optimal value is obtained.

During the training of the multi-attribute convolutional neural network model, no pooling layer is used to compress feature data, to avoid as much as possible the problem of relatively low expression capability of the entire multi-attribute convolutional neural network model caused by the compression of the feature data by the pooling layer, thereby effectively improving the precision of human attribute recognition.

In addition, in a case that a new human attribute is added and/or a new attribute value is added to an original human attribute, a new training image and an original training image may be selected as training images according to a set proportion, and the multi-attribute recognition and training is performed on the training images by using the multi-attribute convolutional neural network, to obtain the multi-attribute convolutional neural network model added with the new human attribute and/or the new attribute value. In this way, the method of adding an original training image to a new training image is used to increase the quantity of training images having the new human attribute and/or the new attribute value, so that the problem that a training result is inaccurate because a relatively small quantity of new training images are used can be effectively avoided, thereby indirectly improving the precision of recognizing a human attribute by using the multi-attribute convolutional neural network model.

Figure 1B:
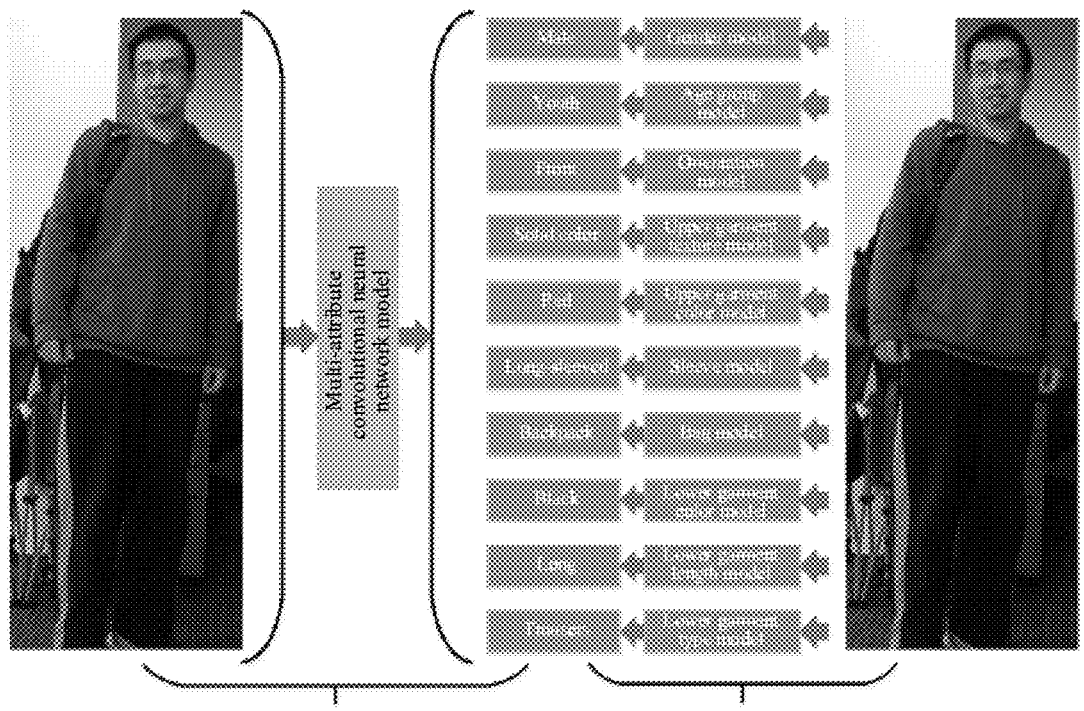
FIG. 1B is a comparison diagram between an input/output of recognizing a human attribute by using a multi-attribute convolutional neural network model according to an embodiment of this application and an input/output of recognizing a human attribute by using a multi-attribute multi-model method.

FIG. 1B is a comparison diagram between an input/output of recognizing a human attribute by using a multi-attribute convolutional neural network model according to an embodiment of this application and an input/output of recognizing a human attribute by using a multi-attribute multi-model method. Compared with a multi-attribute multi-model human attribute recognition method, the multi-attribute convolutional neural network model according to this embodiment of this application can simultaneously recognize a plurality of human attributes, thereby resolving the problem that a plurality of human attributes cannot be simultaneously recognized by using the multi-attribute multi-model human attribute recognition method and also maximizing the efficiency of recognizing a plurality of human attributes.

Figure 2:
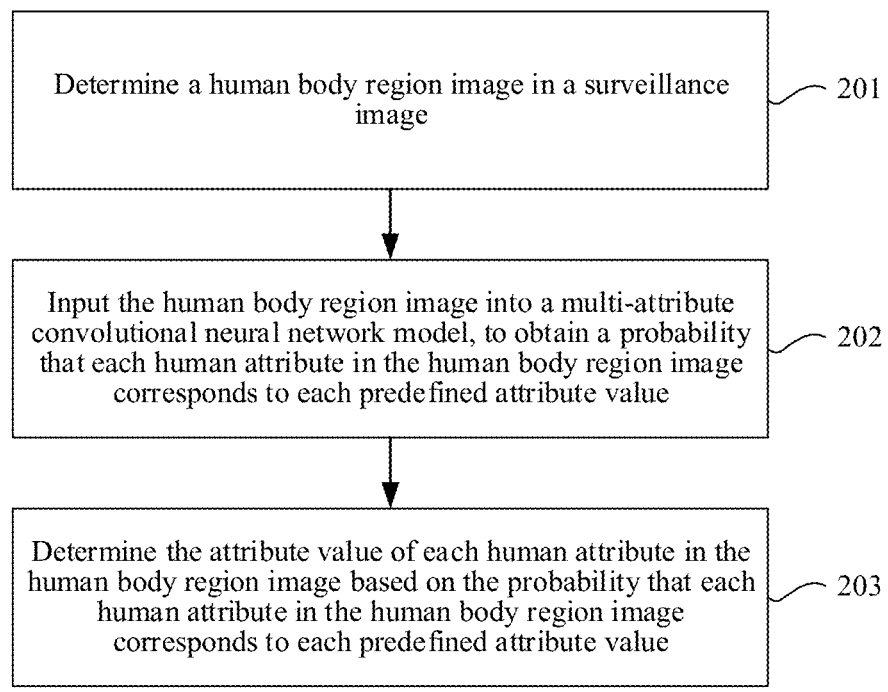
FIG. 2 is a schematic flowchart of a human attribute recognition method according to an embodiment of this application.

After a multi-attribute convolutional neural network model is built, the multi-attribute convolutional neural network model may be used to simultaneously recognize a plurality of human attributes. Specifically, as shown in FIG. 2, the procedure of a human attribute recognition method according to the exemplary implementation of this application is provided below. The method can be performed by a human attribute recognition device:

Step 201: Determine a human body region image in a surveillance image.

Step 202: Input the human body region image into a multi-attribute convolutional neural network model, to obtain a probability that each human attribute in the human body region image corresponds to each predefined attribute value.

The multi-attribute convolutional neural network model is obtained by performing multi-attribute recognition and training on a pre-obtained training image by using a multi-attribute convolutional neural network. Specifically, a method for training the multi-attribute convolutional neural network model is identical with the foregoing training method. Details are not described herein again.

Step 203: Determine the attribute value of each human attribute in the human body region image based on the probability that each human attribute in the human body region image corresponds to each predefined attribute value.

Specifically, a corresponding attribute value with the highest probability among the probabilities that the human attributes correspond to the predefined attribute values is selected for each human attribute in the human body region image as the attribute value of the human attribute.

In the solution shown in FIG. 2, in a case that the human body region image in the surveillance image is detected, human attributes in the human body region image can be simultaneously recognized by using the multi-attribute convolutional neural network model, thereby implementing the function of simultaneously recognizing a plurality of human attributes and effectively improving the efficiency of recognizing a plurality of human attributes.

Figure 3:
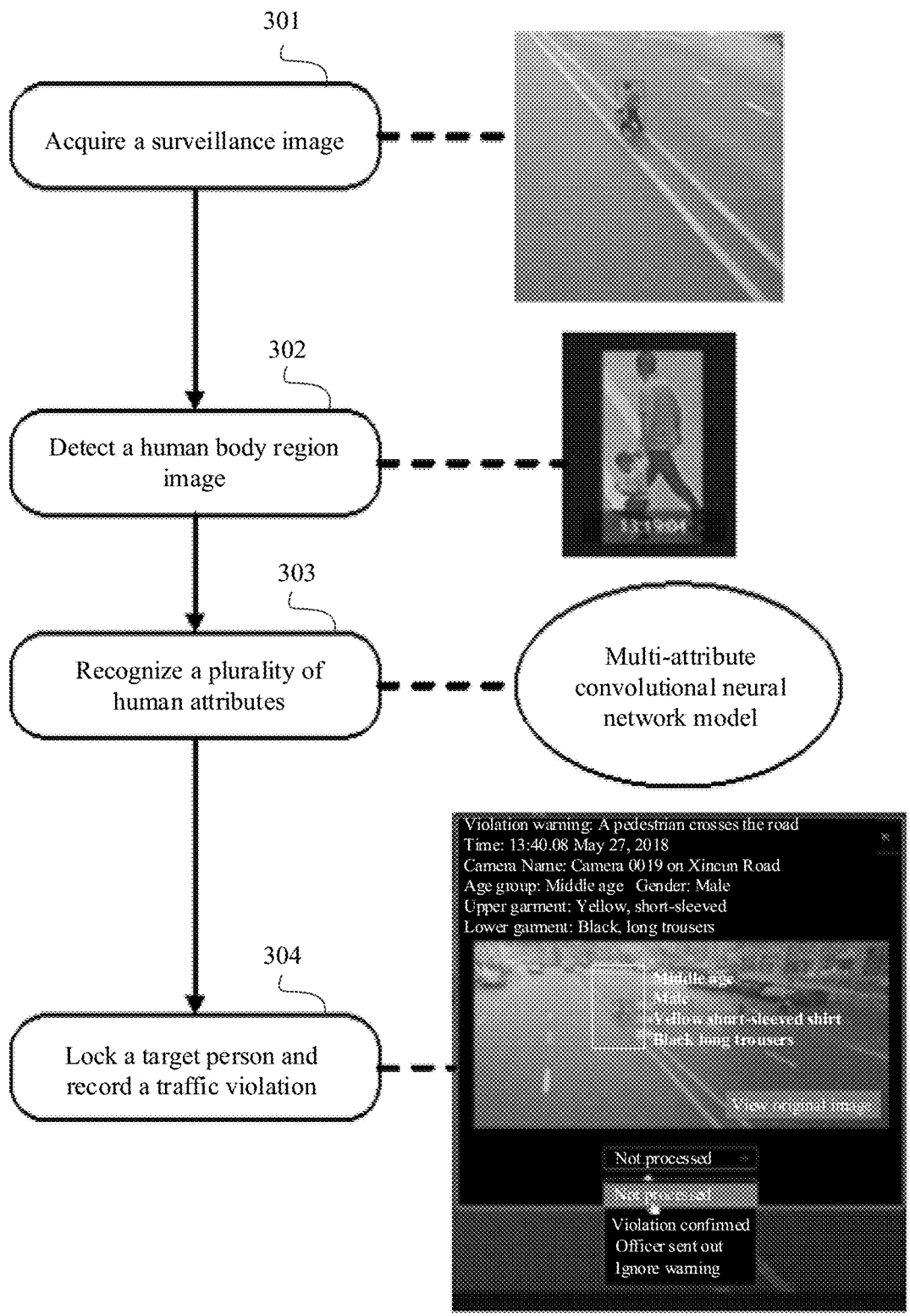
FIG. 3 is a schematic flowchart of a human attribute recognition method when "traffic violation monitoring" is used as a specific application scenario according to an embodiment of this application.

"Traffic violation monitoring" is used as a specific application scenario to describe a human attribute recognition method according to an exemplary implementation of this application. Specifically, as shown in FIG. 3, the procedure of the human attribute recognition method according to the exemplary implementation of this application is as follows:

Step 301: Capture a surveillance image from a surveillance video acquired by a camera.

Step 302: Determine a human body region image in a surveillance image.

Step 303: Input the human body region image into a multi-attribute convolutional neural network model, to obtain a probability that each human attribute in the human body region image corresponds to each predefined attribute value, and determine the attribute value of each human attribute in the human body region image based on the probability that each human attribute in the human body region image corresponds to each predefined attribute value.

A corresponding attribute value with the highest probability among the probabilities that the human attributes correspond to the predefined attribute values is selected for each human attribute in the human body region image as the attribute value of the human attribute, to obtain the attribute value of each human attribute in the human body region image.

Step 304: Lock a target person in the surveillance image according to the attribute value of each human attribute in the human body region image, and mark information such as the attribute value of each human attribute of the target person and a traffic violation on the surveillance image.

In some embodiments, in a case that it is determined that the target person commits a traffic violation, "Violation confirmed" is selected from a violation processing drop-down list, and a record of the traffic violation is generated according to the attribute value of each human attribute of the recognized target person and the traffic violation, and the information such as the attribute value of each human attribute of the target person and the traffic violation is marked on the surveillance image. In some embodiments, the record of the traffic violation includes time and location of the traffic violation as well as personal information of the recognized target person. Certainly, in a case that a police officer is dispatched to process the traffic violation of the target person, "Officer sent out" is selected from the violation processing drop-down list, to terminate the processing of this traffic violation. In a case that it is determined that the target person does not commit a traffic violation, "Ignore traffic violation" is selected from the violation processing drop-down list, the processing of this traffic violation is terminated, and no record of traffic violation is generated.

Figure 4:
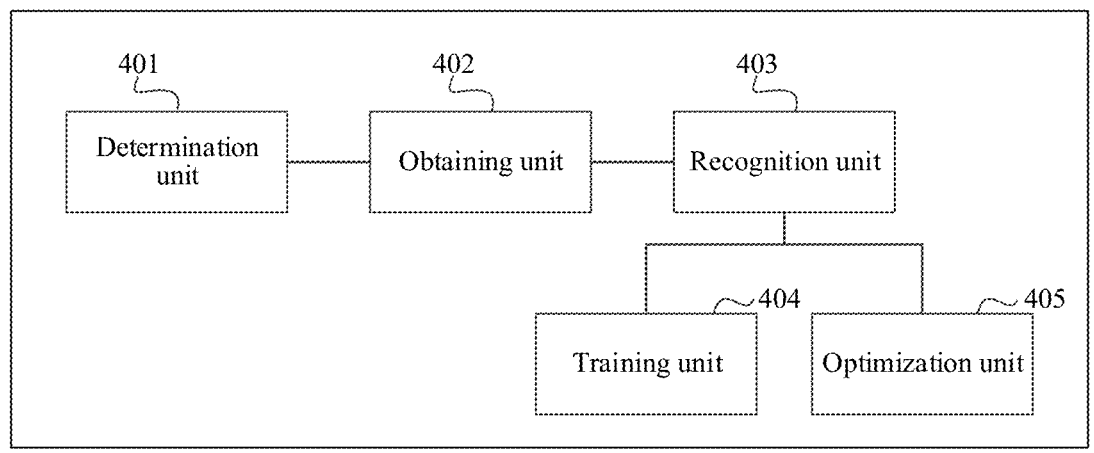
FIG. 4 is a schematic structural diagram of functions of a human attribute recognition apparatus, according to an embodiment of this application.

Based on the embodiment, an embodiment of this application provides a human attribute recognition apparatus, as shown in FIG. 4. The human attribute recognition apparatus includes:

a determination unit 401, configured to determine a human body region image in a surveillance image;

an obtaining unit 402, configured to input the human body region image into a multi-attribute convolutional neural network model, to obtain a probability that each human attribute in the human body region image corresponds to each predefined attribute value, the multi-attribute convolutional neural network model being obtained by performing multi-attribute recognition and training on a pre-obtained training image by using a multi-attribute convolutional neural network; and a recognition unit 403, configured to determine the attribute value of each human attribute in the human body region image based on the probability that each human attribute in the human body region image corresponds to each predefined attribute value.

In some embodiments, the human attribute recognition apparatus further includes:

a training unit 404, configured to: perform, according to the predefined attribute value of each human attribute, the multi-attribute recognition and training on the pre-obtained training image by sequentially using a data input layer, a convolutional layer, an activation layer, and a fully connected layer in the multi-attribute convolutional neural network, to obtain the multi-attribute convolutional neural network model; or perform, according to the predefined attribute value of each human attribute, the multi-attribute recognition and training on the pre-obtained training image by sequentially using a data input layer, a convolutional layer, an activation layer, and a global average pooling layer in the multi-attribute convolutional neural network, to obtain the multi-attribute convolutional neural network model.

In some embodiments, the human attribute recognition apparatus further includes:

an adjustment unit 405, configured to: determine a difference between a predicted attribute value of each human attribute in the training image outputted by the multi-attribute convolutional neural network model and a predefined actual attribute value of each human attribute, the predicted attribute value being determined based on a probability that each human attribute in the training image corresponds to each predefined attribute value; and adjust, according to the difference, a network parameter, corresponding to the multi-attribute convolutional neural network model, on each layer.

In some embodiments, during the determining of the difference between the predicted attribute value of each human attribute in the training image outputted by the multi-attribute convolutional neural network model and the predefined actual attribute value of each human attribute, the adjustment unit 405 is specifically configured to: determine the difference between the predicted attribute value of each human attribute and the predefined actual attribute value of each human attribute by using a cross-entropy loss function.

In some embodiments, the training unit 404 is further configured to:

select, in a case that a new human attribute is added and/or a new attribute value is added to an original human attribute, a new training image and an original training image as training images according to a set proportion; and perform the multi-attribute recognition and training on the training images by using the multi-attribute convolutional neural network, to obtain the multi-attribute convolutional neural network model added with the new human attribute and/or the new attribute value.

In some embodiments, during the determining of the attribute value of each human attribute in the human body region image based on the probability that each human attribute in the human body region image corresponds to each predefined attribute value, the recognition unit 403 is specifically configured to:

select, for each human attribute in the human body region image, a corresponding attribute value with the highest probability among the probabilities that the human attributes correspond to the predefined attribute values as the attribute value of the human attribute.

Because the principle of resolving technical problems of the foregoing human attribute recognition apparatus is similar to that of the foregoing human attribute recognition method, for implementations of the foregoing human attribute recognition apparatus, reference may be made to the implementations of the foregoing human attribute recognition method. Details are not described again.

In summary, in the solution according to this embodiment of this application, in a case that the human body region image in the surveillance image is detected, the human attribute recognition apparatus can use the multi-attribute convolutional neural network model to simultaneously recognize human attributes in the human body region image, thereby implementing the function of simultaneously recognizing a plurality of human attributes and effectively improving the efficiency of recognizing a plurality of human attributes.

Figure 5:
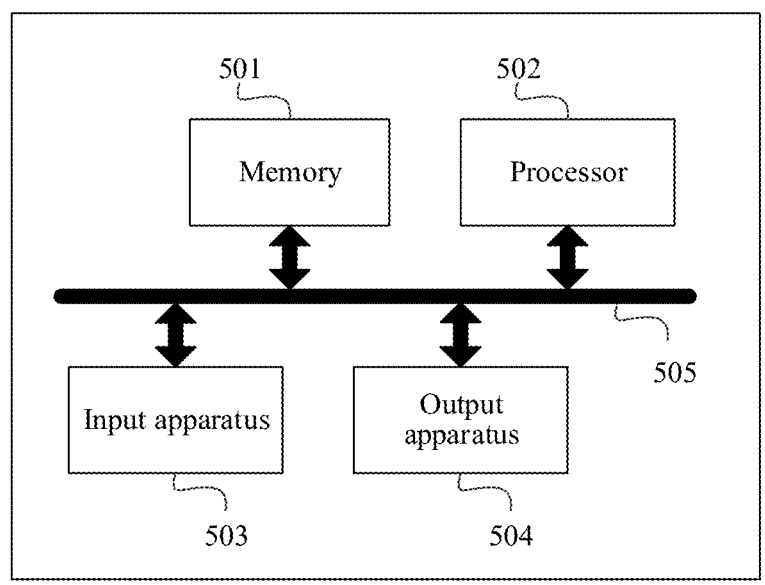
FIG. 5 is a schematic structural diagram of hardware of a human attribute recognition device, according to an embodiment of this application.

In addition, an embodiment of this application further provides a human attribute recognition device. As shown in FIG. 5, the human attribute recognition device includes at least a memory 501, a processor 502, and a computer program stored in the memory 501, the processor 502 executing the computer program to perform the steps of the foregoing human attribute recognition method.

In some embodiments, the human attribute recognition device may further include an input apparatus 503 and an output apparatus 504. The input apparatus 503 may include a stylus, a keyboard, a mouse, a touch screen, and the like. The output apparatus 504 may include a display device such as a liquid crystal display (LCD), a cathode ray tube (CRT), and a touch screen.

A specific connection medium between the memory 501, the processor 502, the input apparatus 503, and the output apparatus 504 is not specifically limited in this embodiment of this application. As shown in FIG. 5, according to this embodiment of this application, the memory 501, the processor 502, the input apparatus 503, and the output apparatus 504 are connected by a bus 505. The bus 505 in FIG. 5 is drawn as a bold line. A connection between other components is merely described in an exemplary description, and is not limited thereto. The bus 505 may be classified into an address bus, a data bus, and a control bus. For convenience of description, the bus in FIG. 5 is merely indicated by one bold line, which does not mean that there is only one bus or only one type of bus.

In summary, in the solution according to this embodiment of this application, in a case that the human body region image in the surveillance image is detected, the human attribute recognition device can use the multi-attribute convolutional neural network model to simultaneously recognize human attributes in the human body region image, thereby implementing the function of simultaneously recognizing a plurality of human attributes and effectively improving the efficiency of recognizing a plurality of human attributes.

The following is a description of a non-volatile computer-readable storage medium according to the exemplary implementations of this application. An embodiment of this application provides a non-volatile computer-readable storage medium. The non-volatile computer-readable storage medium stores an executable program, the executable program being executed by a processor to perform the steps of the foregoing human attribute recognition method. Specifically, the executable program can be built in the human attribute recognition device. Therefore, the human attribute recognition device can perform the steps of the foregoing human attribute recognition method by executing the embedded executable program. Certainly, the executable program can also be application software downloaded and installed on the human attribute recognition device, so that the human attribute recognition device can perform the steps of the foregoing human attribute recognition method through the downloaded and installed executable program.

In addition, the human attribute recognition method according to the embodiments of this application can also be implemented as a program product, the program product including program code. When the program product can be run on a mobile terminal, the program code is used to cause the human attribute recognition device to perform the steps of the foregoing human attribute recognition method.

In some embodiments, the program product according to the embodiments of this application may use any combination of one or more readable media. The readable medium may be a readable signal medium or a readable storage medium. The readable storage medium may be, but is not limited to, an electrical, magnetic, optical, electromagnetic, infrared, or semiconductor system, apparatus, or device, or any combination thereof. Specifically, the readable storage medium in a more specific example (a nonexhaustive list) may include, but is not limited to: an electrical connection with one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof.

In some embodiments, the program product according to the embodiments of this application may use the CD-ROM which includes the program code, and can also be run on a computing device. However, the program product according to the embodiments of this application is not limited thereto. In the embodiments of this application, the readable storage medium may be any tangible medium containing or storing a program, and the program may be used by or used in combination with an instruction execution system, an apparatus, or a device.

The readable signal medium may include a data signal being in a baseband or propagated as a part of a carrier, the data signal carrying readable program code. Such a propagated data signal may be in a plurality of forms, which includes, but is not limited to, an electromagnetic signal, an optical signal, or any suitable combination thereof. The readable signal medium may further be any readable medium in addition to a readable storage medium. The readable medium may send, propagate, or transmit a program that is used by or used in combination with an instruction execution system, an apparatus, or a device.

The program code contained in the readable medium may be transmitted by using any appropriate medium, which includes, but is not limited to, a wireless medium, a wire, an optical cable, any suitable combination thereof, or the like.

Any combination of one or more programming languages may be used to write the program code executing the operation in this application. The programming language includes an object oriented programming language, such as Java and C++, and further includes a normal procedural programming language, such as c programming language or the like. The program code may be completely executed on a user computing device, partly executed on user equipment (UE), executed as an independent software package, partly executed on the user computing device and partly executed on a remote computing device, or completely executed on the remote computing device or a server. In a circumstance related to the remote computing device, the remote computing device may be connected to the user computing device through any type of network, such as a local area network (LAN) or a wide area network (WAN); or may be connected to an outer computing device (for example, through the Internet by an Internet service provider).

Although several units or sub-units of the apparatus are mentioned in the foregoing detailed description, such a division is merely exemplary, but not mandatory. In fact, the features and the functions of two or more units described above may be embodied in one unit according to the implementations of this application. On the other hand, the features and the functions of one unit described above may further be divided into a plurality of units to be embodied.

In addition, although the operations of the method in this application are described in a specific order in the accompanying drawings, this does not require or imply that the operations have to be performed in the specific order, or all the operations shown have to be performed to achieve an expected result. Additionally or alternatively, some steps may be omitted, a plurality of steps may be combined into one step for execution, and/or one step may be decomposed into a plurality of steps for execution.

A person skilled in the art is to know that the embodiments of this application may be provided as a method, a system, or a computer program product. As a result, this application may use a form of hardware only embodiments, software only embodiments, or embodiments with a combination of software and hardware. Moreover, the embodiments of this application may use a form of a computer program product that is implemented on one or more computer-usable storage media (which includes, but is not limited to, a disk memory, a CD-ROM, an optical memory, and the like) that include computer-usable program code.

The embodiments of this application are described with reference to the flowcharts and/or block diagrams of the method, the device (system), and the computer program products according to the embodiments of this application. Computer program instructions can implement each procedure and/or block in the flowcharts and/or block diagrams and a combination of procedures and/or blocks in the flowcharts and/or block diagrams. The computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

The computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

The computer program instructions may also be loaded onto a computer or another programmable data processing device, so that a series of operations and steps are performed on the computer or the other programmable devices, thereby generating computer-implemented processing. Therefore, the instructions executed on the computer or the another programmable device provide steps for implementing a specific function in one or more processes in the flowcharts and/or in one or more blocks in the block diagrams.

Although the preferred embodiments of this application are described, once a person skilled in the art getting knowledge of the basic creative conception, he/she may make other modifications and alterations to the embodiments. Therefore, the accompanying claims intend to be described as including the preferred embodiments and all modifications and alterations fallen within the scope of this application.

Apparently, a person skilled in the art may make any modification and alteration to the embodiments of this application without departing from the spirit and scope of the embodiments of this application. If the modifications and alterations of the embodiments of this application fall into the scope of the claims of this application and equivalent technology of this application, this application further intends to include the modifications and alterations.

What is claimed is:

1. A human attribute recognition method, performed by a computing device having a processor and memory storing a plurality of computer-readable instructions to be executed by the processor, the method comprising:
    determining a human body region image in an image;
    inputting the human body region image into a multi-attribute convolutional neural network model, to simultaneously recognize a plurality of human attributes in the human body region image by:
        obtaining, for each of the plurality of human attributes in the human body region image, a plurality of probabilities corresponding to a plurality of predefined candidate attribute values associated with the human attribute, each probability of the plurality of probabilities indicating that the human attribute corresponds to a respective predefined candidate attribute value of the plurality of predefined candidate attribute values associated with the human attribute, the multi-attribute convolutional neural network model being obtained by performing multi-attribute recognition and training on a set of pre-obtained training images by using a multi-attribute convolutional neural network;
        for each of the plurality of human attributes in the human body region image, selecting, among the plurality of predefined candidate attribute values associated with the human attribute, one predefined candidate attribute value corresponding to a highest probability of the plurality of probabilities corresponding to the plurality of predefined candidate attribute values associated with the human attribute as the attribute value of the human attribute; and
    displaying the attribute values of the plurality of human attributes next to the human body region image.

2. The human attribute recognition method according to claim 1, wherein the determining a human body region image in an image comprises:
    determining a human body region image in a surveillance image.

3. The human attribute recognition method according to claim 1, wherein the performing the multi-attribute recognition and training on the pre-obtained training image by using the multi-attribute convolutional neural network to obtain the multi-attribute convolutional neural network model comprises:
    performing, according to the predefined attribute value of each human attribute, the multi-attribute recognition and training on the pre-obtained training image by sequentially using a data input layer, a convolutional layer, an activation layer, and a fully connected layer in the multi-attribute convolutional neural network, to obtain the multi-attribute convolutional neural network model; or
    performing, according to the predefined attribute value of each human attribute, the multi-attribute recognition and training on the pre-obtained training image by sequentially using a data input layer, a convolutional layer, an activation layer, and a global average pooling layer in the multi-attribute convolutional neural network, to obtain the multi-attribute convolutional neural network model.

4. The human attribute recognition method according to claim 3, further comprising:
determining a difference between a predicted attribute value of each human attribute in the training image outputted by the multi-attribute convolutional neural network model and a predefined actual attribute value of each human attribute, the predicted attribute value being determined based on a probability that each human attribute in the training image corresponds to each predefined attribute value; and
adjusting, according to the difference, a network parameter, corresponding to the multi-attribute convolutional neural network model, on each layer.

5. The human attribute recognition method according to claim 4, wherein the determining a difference between a predicted attribute value of each human attribute in the training image outputted by the multi-attribute convolutional neural network model and a predefined actual attribute value of each human attribute comprises:
determining the difference between the predicted attribute value of each human attribute and the predefined actual attribute value of each human attribute by using a cross-entropy loss function.

6. The human attribute recognition method according to claim 3, further comprising:
selecting, in a case that a new human attribute is added and/or a new attribute value is added to an original human attribute, a new training image and an original training image as training images according to a set proportion; and
performing the multi-attribute recognition and training on the training images by using the multi-attribute convolutional neural network, to obtain the multi-attribute convolutional neural network model added with the new human attribute and/or the new attribute value.

7. The human attribute recognition method according to claim 1, further comprising:
determining a traffic violation according to the attribute values of the plurality of human attributes; and
generating a record of traffic violation for a recognized target person corresponding to the human body in the image, the recording including time and location of the traffic violation and personal information of the recognized target person.

8. A computing device, comprising a memory and a processor, the memory storing a plurality of computer-readable instructions, the instructions causing the processor to perform a plurality of operations including:
determining a human body region image in an image;
inputting the human body region image into a multi-attribute convolutional neural network model, to simultaneously recognize a plurality of human attributes in the human body region image by:
obtaining, for each of the plurality of human attributes in the human body region image, a plurality of probabilities corresponding to a plurality of predefined candidate attribute values associated with the human attribute, each probability of the plurality of probabilities indicating that the human attribute corresponds to a respective predefined candidate attribute value of the plurality of predefined candidate attribute values associated with the human attribute, the multi-attribute convolutional neural network model being obtained by performing multi-attribute recognition and training on a set of pre-obtained training images by using a multi-attribute convolutional neural network;
for each of the plurality of human attributes in the human body region image, selecting, among the plurality of predefined candidate attribute values associated with the human attribute, one predefined candidate attribute value corresponding to a highest probability of the plurality of probabilities corresponding to the plurality of predefined candidate attribute values associated with the human attribute as the attribute value of the human attribute; and
displaying the attribute values of the plurality of human attributes next to the human body region image.

9. The computing device according to claim 8, wherein the determining a human body region image in an image comprises:
determining a human body region image in a surveillance image.

10. The computing device according to claim 8, wherein the performing the multi-attribute recognition and training on the pre-obtained training image by using the multi-attribute convolutional neural network to obtain the multi-attribute convolutional neural network model comprises:
performing, according to the predefined attribute value of each human attribute, the multi-attribute recognition and training on the pre-obtained training image by sequentially using a data input layer, a convolutional layer, an activation layer, and a fully connected layer in the multi-attribute convolutional neural network, to obtain the multi-attribute convolutional neural network model; or
performing, according to the predefined attribute value of each human attribute, the multi-attribute recognition and training on the pre-obtained training image by sequentially using a data input layer, a convolutional layer, an activation layer, and a global average pooling layer in the multi-attribute convolutional neural network, to obtain the multi-attribute convolutional neural network model.

11. The computing device according to claim 10, wherein the plurality of operations further comprise:
determining a difference between a predicted attribute value of each human attribute in the training image outputted by the multi-attribute convolutional neural network model and a predefined actual attribute value of each human attribute, the predicted attribute value being determined based on a probability that each human attribute in the training image corresponds to each predefined attribute value; and
adjusting, according to the difference, a network parameter, corresponding to the multi-attribute convolutional neural network model, on each layer.

12. The computing device according to claim 11, wherein the determining a difference between a predicted attribute value of each human attribute in the training image outputted by the multi-attribute convolutional neural network model and a predefined actual attribute value of each human attribute comprises:
determining the difference between the predicted attribute value of each human attribute and the predefined actual attribute value of each human attribute by using a cross-entropy loss function.

13. The computing device according to claim 10, wherein the plurality of operations further comprise:
selecting, in a case that a new human attribute is added and/or a new attribute value is added to an original human attribute, a new training image and an original training image as training images according to a set proportion; and performing the multi-attribute recognition and training on the training images by using the multi-attribute convolutional neural network, to obtain the multi-attribute convolutional neural network model added with the new human attribute and/or the new attribute value.

14. The computing device according to claim 8, wherein the plurality of operations further comprise:

determining a traffic violation according to the attribute values of the plurality of human attributes; and generating a record of traffic violation for a recognized target person corresponding to the human body in the image, the recording including time and location of the traffic violation and personal information of the recognized target person.

15. A non-transitory computer-readable storage medium, storing a plurality of processor-executable instructions, the instructions, when executed by one or more processors of a computing device, causing the one or more processors to perform a plurality of operations including:

determining a human body region image in an image;

inputting the human body region image into a multi-attribute convolutional neural network model, to simultaneously recognize a plurality of human attributes in the human body region image by:

obtaining, for each of the plurality of human attributes in the human body region image, a plurality of probabilities corresponding to a plurality of predefined candidate attribute values associated with the human attribute, each probability of the plurality of probabilities indicating that the human attribute corresponds to a respective predefined candidate attribute value of the plurality of predefined candidate attribute values associated with the human attribute, the multi-attribute convolutional neural network model being obtained by performing multi-attribute recognition and training on a set of pre-obtained training images by using a multi-attribute convolutional neural network;

for each of the plurality of human attributes in the human body region image, selecting, among the plurality of predefined candidate attribute values associated with the human attribute, one predefined candidate attribute value corresponding to a highest probability of the plurality of probabilities corresponding to the plurality of predefined candidate attribute values associated with the human attribute as the attribute value of the human attribute; and displaying the attribute values of the plurality of human attributes next to the human body region image.

16. The non-transitory computer-readable storage medium according to claim 15, wherein the determining a human body region image in an image comprises:

determining a human body region image in a surveillance image.

17. The non-transitory computer-readable storage medium according to claim 15, wherein the performing the multi-attribute recognition and training on the pre-obtained training image by using the multi-attribute convolutional neural network to obtain the multi-attribute convolutional neural network model comprises:

performing, according to the predefined attribute value of each human attribute, the multi-attribute recognition and training on the pre-obtained training image by sequentially using a data input layer, a convolutional layer, an activation layer, and a fully connected layer in the multi-attribute convolutional neural network, to obtain the multi-attribute convolutional neural network model; or performing, according to the predefined attribute value of each human attribute, the multi-attribute recognition and training on the pre-obtained training image by sequentially using a data input layer, a convolutional layer, an activation layer, and a global average pooling layer in the multi-attribute convolutional neural network, to obtain the multi-attribute convolutional neural network model.

18. The non-transitory computer-readable storage medium according to claim 17, wherein the plurality of operations further comprise:

determining a difference between a predicted attribute value of each human attribute in the training image outputted by the multi-attribute convolutional neural network model and a predefined actual attribute value of each human attribute, the predicted attribute value being determined based on a probability that each human attribute in the training image corresponds to each predefined attribute value; and adjusting, according to the difference, a network parameter, corresponding to the multi-attribute convolutional neural network model, on each layer.

19. The non-transitory computer-readable storage medium according to claim 17, wherein the plurality of operations further comprise:

selecting, in a case that a new human attribute is added and/or a new attribute value is added to an original human attribute, a new training image and an original training image as training images according to a set proportion; and performing the multi-attribute recognition and training on the training images by using the multi-attribute convolutional neural network, to obtain the multi-attribute convolutional neural network model added with the new human attribute and/or the new attribute value.

20. The non-transitory computer-readable storage medium according to claim 15, wherein the plurality of operations further comprise:

determining a traffic violation according to the attribute values of the plurality of human attributes; and generating a record of traffic violation for a recognized target person corresponding to the human body in the image, the recording including time and location of the traffic violation and personal information of the recognized target person.

\* \* \* \* \*